TELEVISION SCANNING SYSTEM

Filed Feb. 3, 1950 5 Sheets-Sheet 1

INVENTOR
Alfred N. Goldsmith
BY
[signature]
ATTORNEY

INVENTOR
Alfred N. Goldsmith
[signature]
ATTORNEY

INVENTOR
Alfred N. Goldsmith
BY [signature]
ATTORNEY

INVENTOR
Alfred N. Goldsmith
BY
[signature]
ATTORNEY

March 1, 1955 A. N. GOLDSMITH 2,703,339

TELEVISION SCANNING SYSTEM

Filed Feb. 3, 1950 5 Sheets-Sheet 5

INVENTOR
Alfred N. Goldsmith
BY
ATTORNEY

United States Patent Office 2,703,339

Patented Mar. 1, 1955

2,703,339

TELEVISION SCANNING SYSTEM

Alfred N. Goldsmith, New York, N. Y., assignor to Radio Corporation of America, a corporation of Delaware Application February 3, 1950, Serial No. 142,113

4 Claims. (Cl. 178—5.2)

Figure 5:
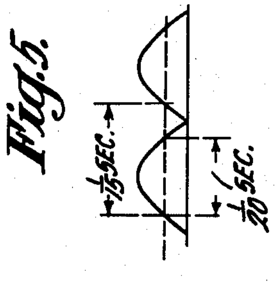

This invention relates to television scanning systems, and more particularly to an improved television scanning system and method of operation which are adapted to transmit and/or receive a sequence of pictures some of which have a relatively large number of lines and a correspondingly increased time of transmission and others of which have a relatively small number of lines and a correspondingly decreased time of transmission. In accordance with the invention, (1) the scanning spot may be made smaller as the number of lines is increased and vice versa and (2) the frequency band occupied by each picture of the sequence may be the same as that occupied by any standard picture such as the 441-line interlaced-line picture.

Such a sequence of pictures is cyclically repeated and has as its purpose (1) the reduction of flicker in monochrome and color pictures, (2) the production of color pictures having the maximum amount of color and detail information, (3) the production of color pictures wherein each component-color picture has the resolution suitable to the delineatory capabilities of that particular color, (4) the avoidance, if desired, of the high degree of precision involved in interlaced scanning and (5) other purposes which will appear as the various features of the invention are explained in greater detail.

Thus to insure the realization of the maximum amount of color and detail information, the color-component transmissions for those colors having maximum delineatory capabilities are made to occupy a longer period of time and to have a greater number of scanning lines and picture elements than for those colors having lesser delineatory capabilities. It is assumed that fine detail can be readily depicted by green lines against a neutral or black background, somewhat less readily depicted by bright red lines on a neutral background, and least readily depicted by blue lines on a neutral background. The exact selection of delineatory capabilities for each component-color is not germane to the methods and purposes of the invention, and it is to be understood that the assumed order of delineatory capabilities and the assumed corresponding ratios of scanning times for the respective color-component pictures are arbitrary and illustrative. This, however, does not affect the generality of the method by which the invention is carried into effect. Assuming a smooth raster, for each of the component-color pictures, no necessary relationship of interlacing or any analogous relationship of scanning-line placement in successive pictures is involved. All that is required is that the color-component pictures, as a whole, shall be in registry.

To illustrate the functioning of the invention, a purely illustrative case has been taken and will now be described in detail in the following. It is based on the assumption that the maximum scanning time and number of lines in each color-component sequence will be devoted to the green pictures, and the minimum time to the blue pictures with intermediate values for the red pictures. An illustrative, but not limiting example will be given in the following. It is to be understood that it illustrates the principle of interlaced-timing color television (or monochrome television) but that the particular numerical values which are used have been selected as exemplary only.

It is well known that the number of lines in a picture are proportional to the square root of the frequency band occupied by the transmission and inversely proportional to the square root of the number of frames per second for the transmission. It is also a matter of experimental fact that, according to the present television practices in the United States, a 525-line picture at 30 frames per second occupies a band of 4.25 megacycles. The sound which is transmitted in association with the picture occupies a portion of the remaining 1.75-mc. region, and the sound and picture together therefore occupy a 6-mc. band.

For the purposes of color television, a channel of double width, or 12-mc. wide, is used in the illustration of this disclosure. Of this 12 megacycles, 10.25 mc. are assigned to the television transmission, the remaining 1.75 mc. accommodating the sound. Accordingly each of the color-component transmissions which follow cyclically and sequentially according to the methods of this disclosure occupy a 10.25-mc. band.

The transmissions of the blue-component pictures are assumed to take $\frac{1}{180}$ of a second; those of the red-component pictures $\frac{2}{180}$ seconds or $\frac{1}{90}$ second; and the green-component pictures $\frac{3}{180}$ second or $\frac{1}{60}$ second. Accordingly the maximum picture detail will be given in the green pictures and the minimum in the blue pictures, but as stated above, this particular selection of orders of increasing delineation is purely illustrative.

A simple computation based upon the above relation between number of lines, frequency band, and frames per second, indicates that the blue pictures would have 334 lines; the red pictures 471 lines; and the green pictures 577 lines. The nearest practicable values to these which are accordingly proposed for this illustration are the following:

Blue pictures of 325 lines and 180 frames per second.
Red pictures with 475 lines and 90 frames per second.
Green pictures with 575 lines and 60 frames per second.

The average number of lines per full-color picture will probably appear to be well in excess of 450 lines; there will be 30 complete frames or pictures per second which is in agreement with ordinary monochromatic practice; and there will be an average of apparently over 90 color fields per second. All detail in the resulting pictures will of course be in full color.

An obvious computation also indicates that the corresponding line-deflection generator frequencies (frequencies of the sawtooth deflection wave generators) will be as follows in the above illustrative case:

For the blue pictures: 58,500 cycles per second.
For the red pictures: 42,750 cycles per second.
For the green pictures: 34,500 cycles per second.

As another alternative, which might however lead to the possibility of flicker in the bright portions of the picture with adequate picture brightness, and also to limited resolution, it is assumed that a 4.25-mc. band is used. The closest practicable number of lines for each of the pictures would then be as follows:

For the blue pictures: 275 lines at 120 frames per second.

For the red pictures: 375 lines at 60 frames per second.

For the green pictures: 441 lines at 40 frames per second.

As stated, the immediately above material is submitted as another example of what can be accomplished by interlaced-timing color television within a 4.25-mc. band. While the results thus obtained would, it is believed, be superior to those of a particular proposed 120-frame-per-second interlaced-linear color-television system (particularly because of the 441-line green picture) the previous illustrative example wherein a 10.25-mc. band is used with blue-component pictures at 180-frames-per-second rate, and so on, is regarded as even better and will therefore be referred to exclusively in the following discussion and in the various figures descriptive of the invention.

It may be added that an advantage of the longer scanning time for the red and green pictures is that it is also possible thus to get more light into these pictures at the pickup and reproducing end. The method, in fact, averages the scanning rate around that of the red-component pictures. The green images in interlaced-timing television have almost the effect of a high-detail black-and-white "key plate," so far as their contributory effect to picture detail is concerned. It should also be remembered in this connection that most colors in nature are rather dark and composite (that is, containing red, green, and blue components). Thus most colors when picked up and reproduced by the interlaced-timing color-television system will share in the advantages of the higher red-component and green-component pictures.

The invention will be better understood from the following description considered in connection with the accompanying drawings and its scope is indicated by the appended claims.

In the drawings, Figures 1 to 6 illustrate the invention as applied to the transmission and reception of monochrome pictures and Figures 7 to 11 illustrate its application to the transmission and reception of color pictures.

Figure 4:
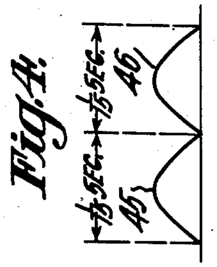
Figure 3:
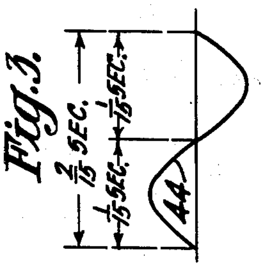
Figure 2:
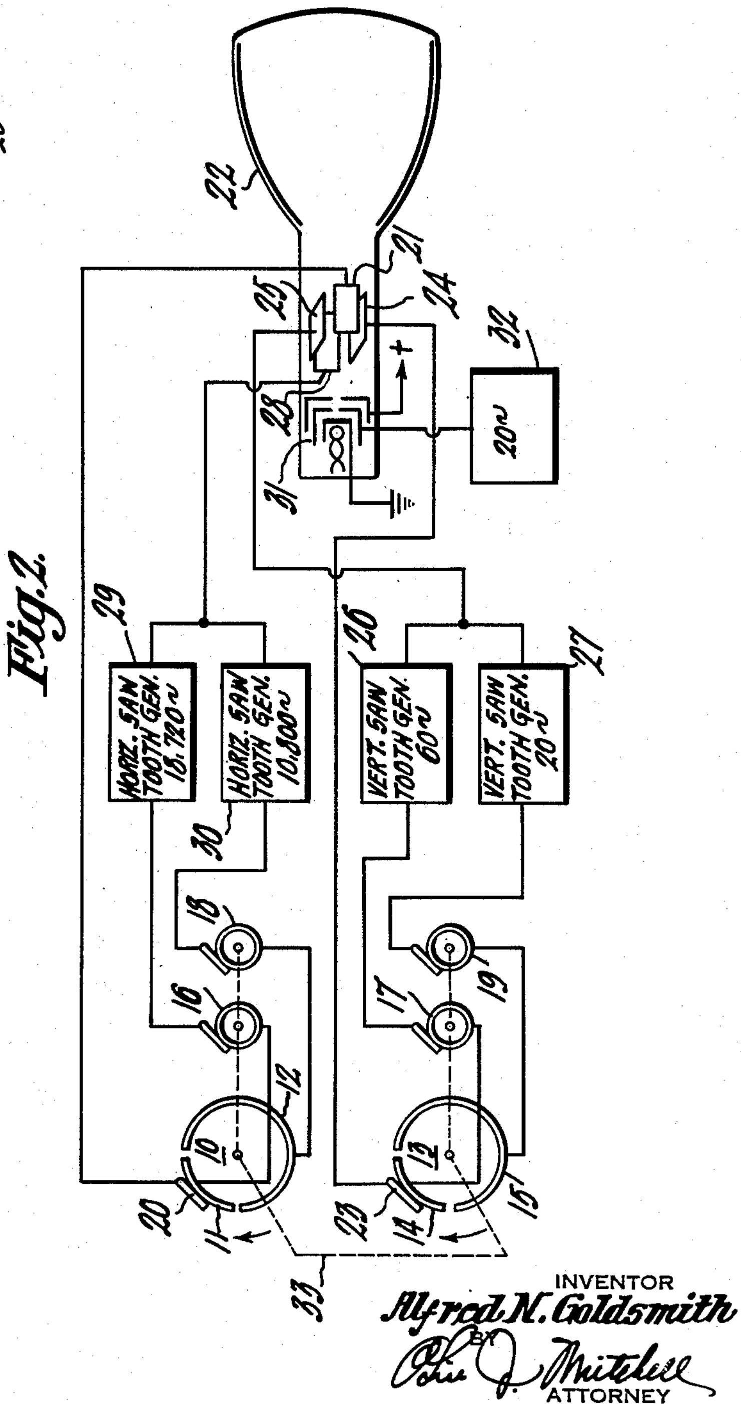
Figure 1:
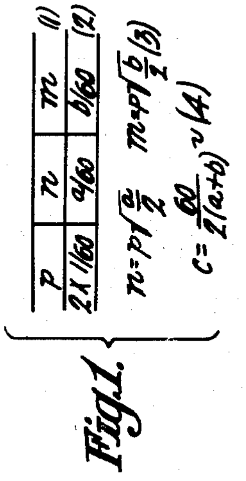
Figure 6:
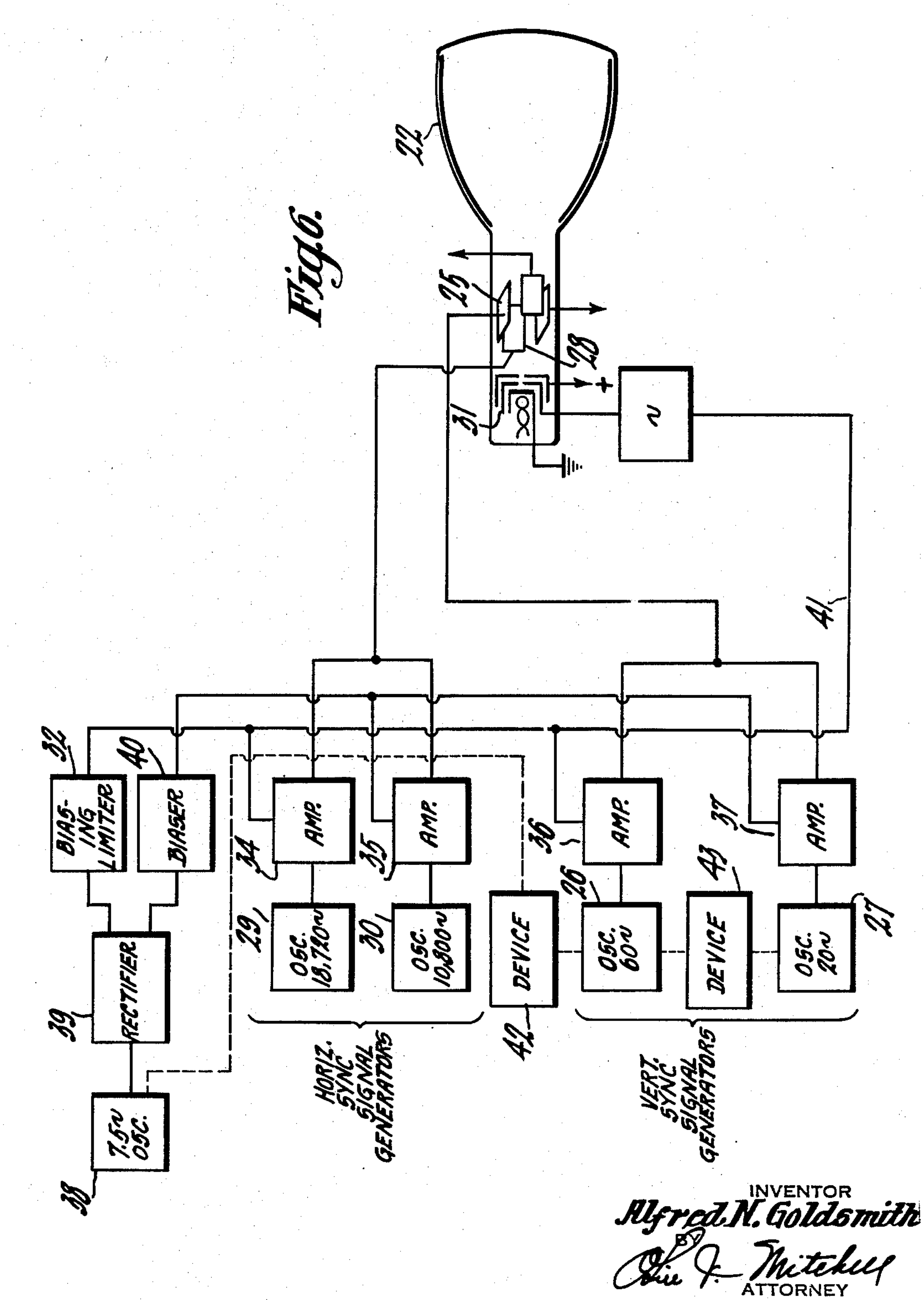
Figure 7:
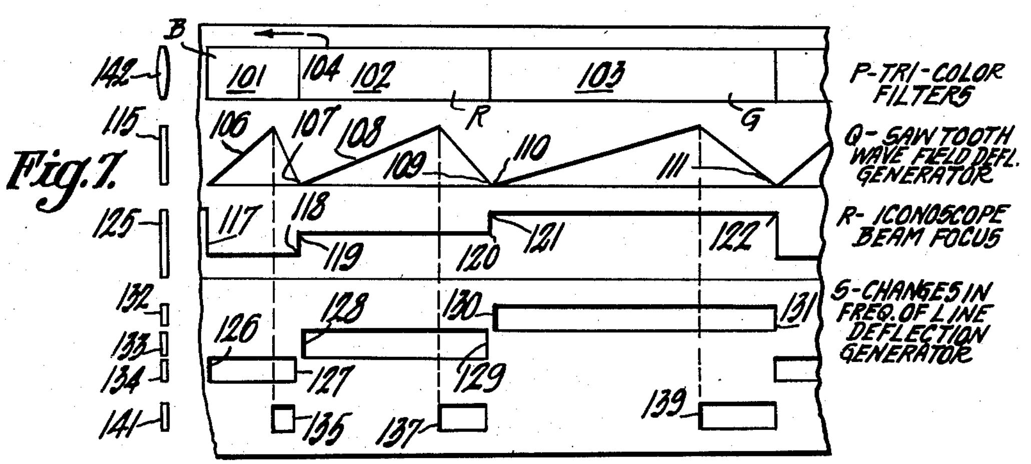
Figure 8:
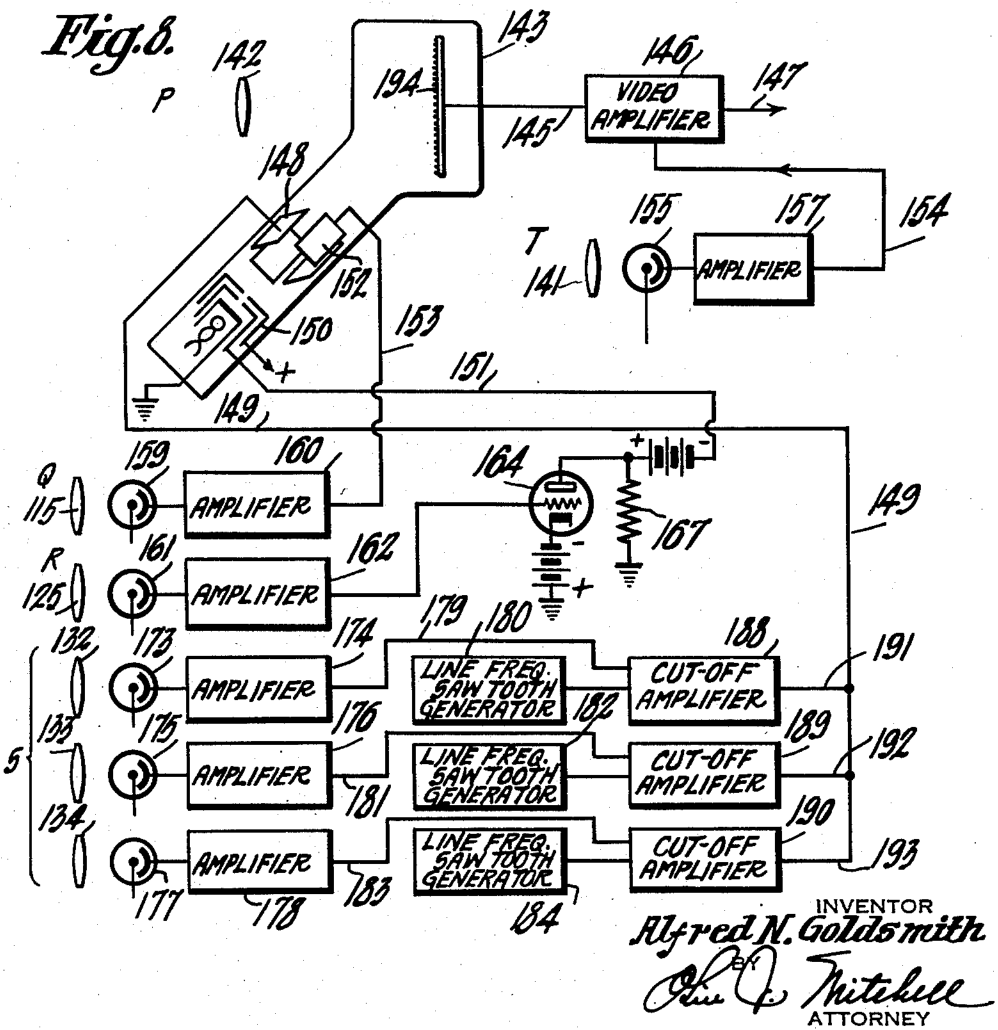
Figure 9:
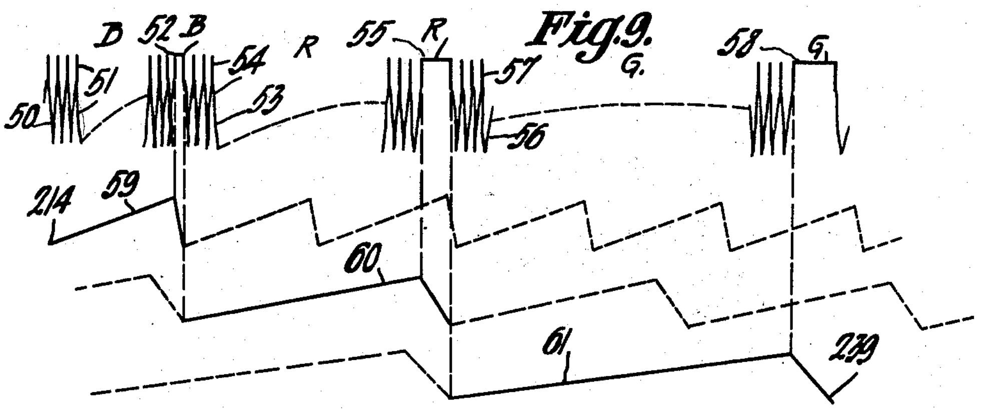
Figure 10:
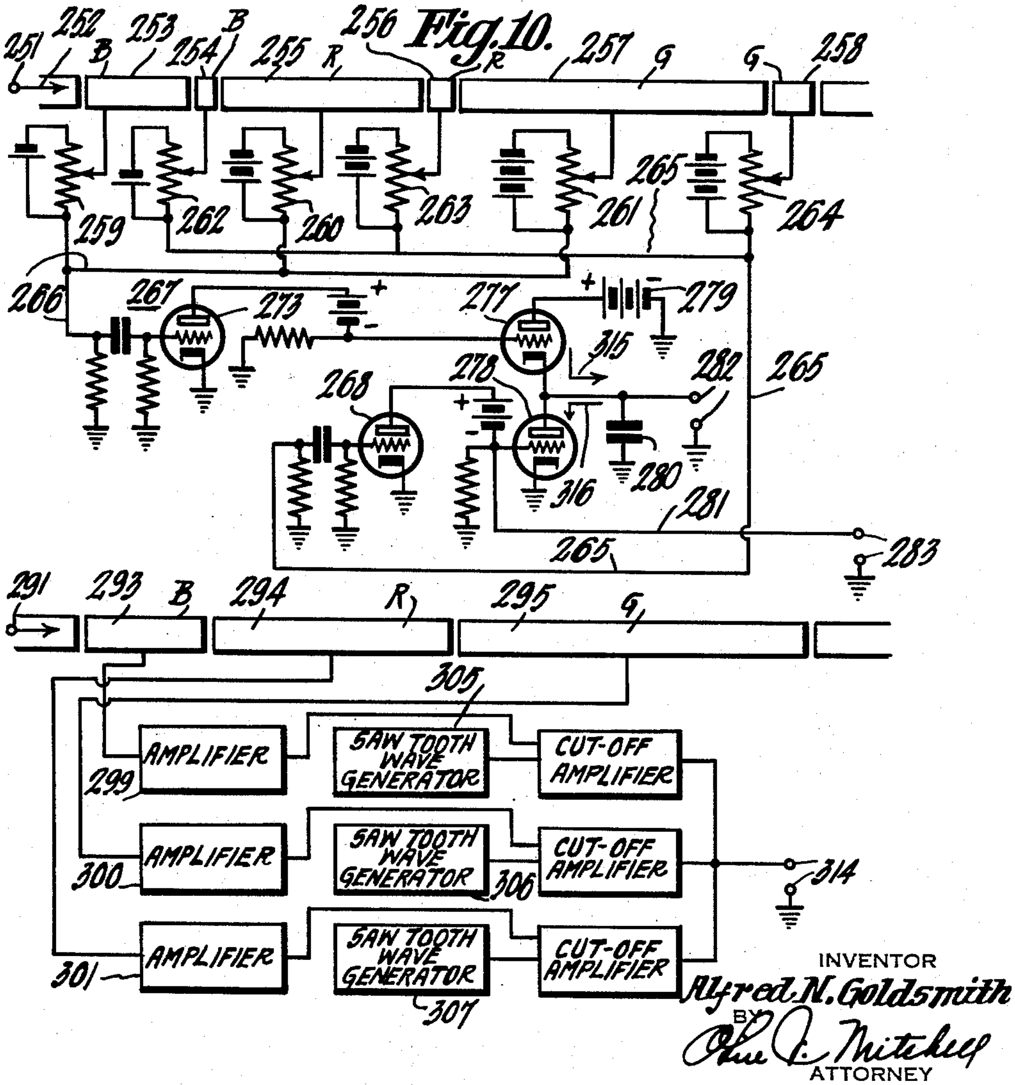
Figure 11:
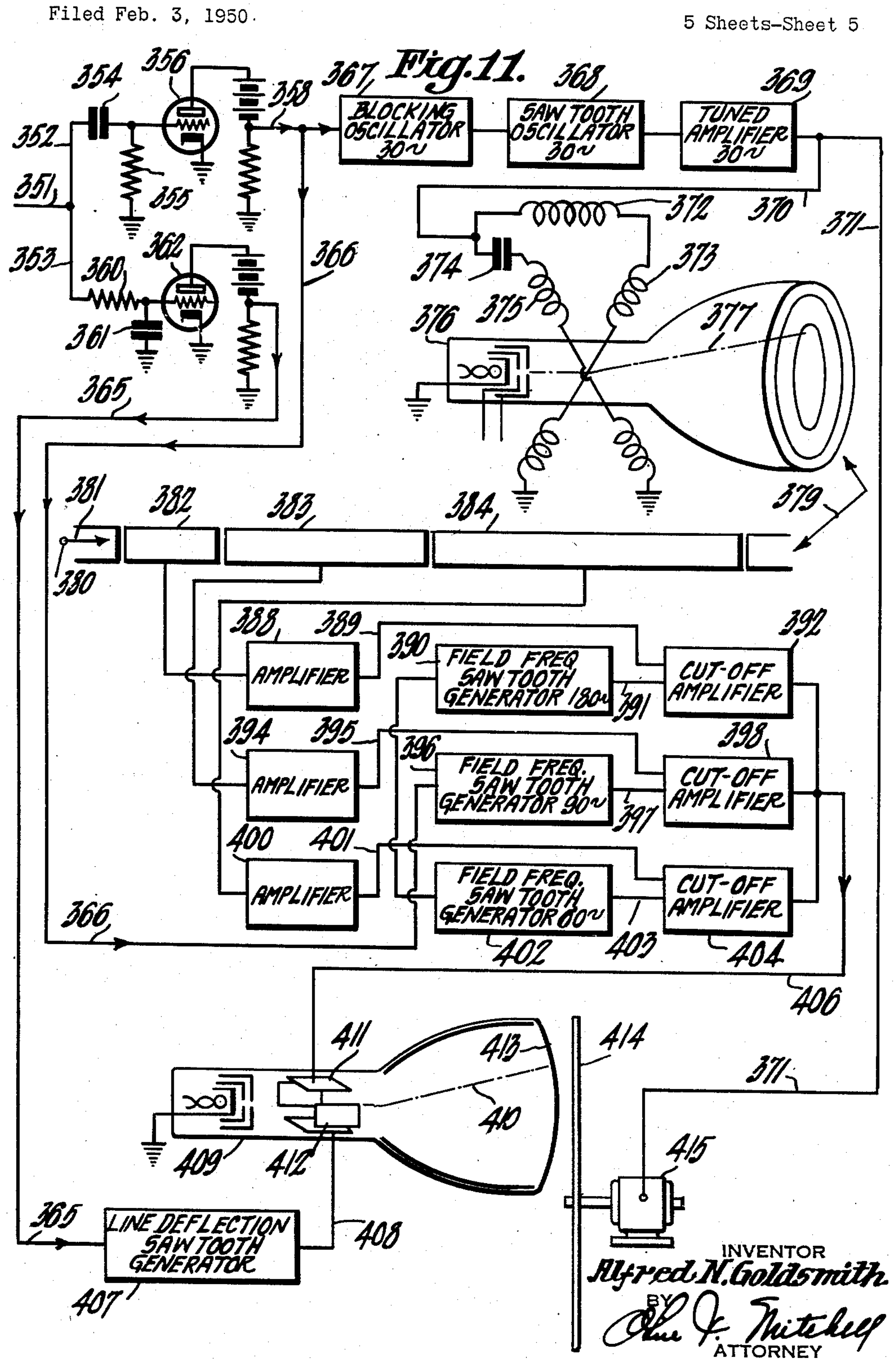

Referring to the drawings in greater detail:

Figure 1 is an explanatory diagram relating to the transmission and reception of monochrome pictures, Figure 2 illustrates a mechanically controlled type of scanning system for a monochrome picture transmitter, Figures 3 to 5 are explanatory diagrams illustrating the operation of the scanning system of Figure 2, Figure 6 illustrates an electronically controlled type of scanning for a monochrome picture transmitter, Figures 7 and 8 illustrate a color picture transmitter having a photoelectric and mechanical type of scanning control circuit, Figure 9 is an explanatory diagram relating to the operation of the transmitter of Figures 7 and 8, Figure 10 illustrates an electronic type of scanning control circuit which functions in a manner similar to the control circuit of Figures 7 and 8, and Figure 11 illustrates a receiver adapted to receive the signals emitted by the transmitter of Figures 7 and 8 or that of Figure 10.

Line 2 of Figure 1 gives the time of transmission of a complete picture according to each of the three methods. Thus, for 441-line interlaced scanning, it will be seen that the alternate lines are sent in 1/60 of a second and the complete picture in 1/30 of a second. It is assumed that the transmission according to the present disclosure sends the $n$-line pictures in $a/60$ of a second, and that it sends the $m$-line pictures in $b/60$ of a second.

Assuming that all three transmissions described in lines 1 and 2 of Figure 1 are to occupy the same frequency band, it can be readily shown that the number of lines according to transmission following the present disclosure are given by the two equations on line 3 of Figure 1. Line 4 of Figure 1 gives the quantity "$c$," which is the frequency in cycles per second of an oscillator capable of generating, by methods hereinafter set forth, biases suitable for the change-over of transmission from the $n$-line to the $m$-line pictures and vice versa. That is, the $c$-cycle oscillator defined by line 4 of Figure 1 is used suitably to change the number of lines per picture, the rate of vertical scanning, and, if desired, the size of the scanning spot.

Figure 2 shows an arrangement wherein the commutation or switching between the $n$-line and $m$-line pictures is accomplished mechanically by means including a commutator 10 which has segments 11 and 12 and a commutator 13 which has segments 14 and 15. The segments 11 and 14 are substantially 90 degrees wide and are connected respectively to a slip ring 16 and a slip ring 17. The segments 12 and 15 are substantially 270 degrees wide and are connected respectively to a slip ring 18 and a slip ring 19. Both commutators may be rotated in the direction indicated by the arrows at a speed of 15 revolutions per second, for example.

Arranged to cooperate with the commutator 10 is a brush 20 which is connected to the horizontal deflector 21 of a picture transmitting tube or iconoscope 22. Similarly arranged to cooperate with the commutator 13 is a brush 23 which is connected to the vertical deflector 24 of the iconoscope 22. The iconoscope 22 has its other vertical deflector 25 connected through sawtooth generators 26 and 27 respectively to the slip rings 17 and 19 and has its other horizontal deflector 28 connected through sawtooth generators 29 and 30 respectively to the slip rings 16 and 18.

For the purposes of the illustration herein given, the following values are assigned to this transmission. The quantity $p$ is 441; $n$ is 312 approximately, and $a$ is 1; and $m$ is 540 and $b$ is 3. Thus the method of scanning is to send a 312-line picture in 1/60 of a second, or at the rate of 18,720 lines per second, and then to send a 540-line picture in 1/20 of a second or at the rate of 10,800 lines per second. The quantity "$c$" becomes 7.5 cycles per second and will be found useful in connection with the analysis of Figure 6.

It will be noted in Figure 2 that the horizontal sawtooth wave line deflection oscillators 29 and 30 have respectively the required frequencies. It will be noted further that the vertical sawtooth wave deflection generators 26 and 27 have frequencies corresponding to the values required by line 2 of Figure 1. The frequency band occupied by each of the successively transmitted pictures according to the method of Figure 2 will occupy the same frequency band as a 441-line inter-laced-line picture according to the present scanning methods, which may be taken to be 3.89 mc.

The iconoscope 22 has a beam-focusing electrode 31 which is adapted to control the size of the scanning spot. To the electrode 31 is applied a normal bias and an additional 20-cycle bias of square wave form which is derived from a source 32 suitably related to the timing sector 12 of the commutator 10.

Operation of the scanning system of Figure 1 is assumed to begin with the brushes 20 and 23 on the segments 11 and 14 respectively. The commutators 10 and 13 rotate in synchronism as indicated by the broken line 33. Under these conditions, the output of the oscillator 29 is useful for horizontal deflection in the iconoscope 22 and the output of oscillator 26 is useful for vertical deflection in the iconoscope 22. Accordingly a 312-line picture will be scanned during 1/60 of a second.

The brush 20 will then have passed off segment 11, inasmuch as the commutators rotate 15 times per second in Figure 2. Thus segment 11, which corresponds to one-quarter of a revolution, passes under brush 20 in 1/60 of a second. Accordingly, on the conclusion of the scanning of the 312-line picture in 1/60 of a second, the brush 20 will make contact with segment 12 and the brush 23 will correspondingly make contact with segment 15. These brushes will remain in contact with the corresponding segments for 3/60 or 1/20 of a second. During this period oscillator 30 will be active in producing horizontal deflection in the iconoscope 22 and oscillator 27 will be active in producing vertical deflection in the iconoscope 22. There will thus be scanned a 540-line picture in 1/20 of a second. Thus the procedure will be in accord with the data above described.

It will be noted also that the spot-size or focusing control element 31 in the iconoscope, whether magnetic or electrostatic in nature or both, operates "on the normal bias." There is added to this normal bias the control bias. This places an additional constant focusing control on the element 31 fifteen times per second and for a period of 1/20 of a second during each 1/15 of a second period. This bias, of rectangular wave form, must be applied in synchronism with the passage of segment 12 under brush 20. Alternatively, the bias in question, by acting in the reverse sense, can be applied 15 times a second but each time during only 1/60 of a second, in which case it must be applied in synchronism with the passage of segment 11 under brush 20. The corresponding mechanical commutating methods are obvious and have not been shown in Figure 2. The effect of the control bias is to decrease the size of the scanning spot to correspond to a 540-line picture during 1/20 of a second while permitting it to remain at a size corresponding to a 312-line picture during the remaining 1/60 of a second during each 1/15 of a second period. Obviously the control bias action can be used either to diminish the spot size or to increase it as may be preferred, provided it is in every case arranged that the spot size corresponds to smooth scanning of a picture of the corresponding number of lines.

In the electronically controlled scanning system of Figure 6, the horizontal deflector 28 is connected to the oscillators 29 and 30 through the amplifiers 34 and 35 respectively and the vertical deflector 25 is connected to the oscillators 26 and 27 through amplifiers 36 and 37 respectively. The amplifiers 34, 35, 36 and 37 have applied to their input circuits (as hereinafter explained) such bias potentials as are required to correlate the application of the outputs of the sources 26, 27, 29 and 30 to the deflectors 25 and 28 of the iconoscope 22.

Such bias potentials are derived from a 7.5-cycle oscillator 38 through a rectifier 39 and either a biasing limiter 32 or a biaser 40. Output from the biasing limiter 32 is also applied through a lead 41 to the spot control electrode 31 of the iconoscope 22. The oscillators 26 and 27 are electrically interlocked with the oscillator in order to ensure correct timing of the application of the bias potentials to the amplifiers. Thus the oscillator 38 is connected to the oscillator 26 through a device 42 which selects the eighth harmonic of the oscillator 38 and the oscillator 26 is connected to the oscillator 27 through a device 43 which selects the third subharmonic of the oscillator 26.

The oscillator 38 produces a potential having a wave form like that indicated by the curve 44 of Figure 3. After rectification by the rectifier 39 of Figure 6, there is produced a potential having the wave form indicated by the curve 45—46 of Figure 4. This rectified wave 45—46 passes into the biasing limiter 32 and the biaser 40 which act alternately and oppositely.

The effect of the limiter 32 is to produce a potential which has a rectangular wave form and is at its maximum value for $\frac{1}{20}$ of a second and at zero for $\frac{1}{60}$ of a second as indicated by Figure 5. This potential of rectangular wave form is applied (1) to the amplifiers 34 and 36 in such fashion as to cause them to become active and pass current for only $\frac{1}{60}$ of a second during each $\frac{1}{15}$ of a second period and (2) to the focusing electrode 31 which functions as explained in connection with Figure 2.

The biaser 40 may be similar to the biasing limiter 32 but, in this case, the limiting bias is applied with opposite polarity to the amplifiers 35 and 37, causing them to become active for $\frac{1}{20}$ of a second during each $\frac{1}{15}$ of a second period. Thus amplifiers 34 and 36 on one hand, and amplifiers 35 and 37 on the other hand, become alternately active.

The different systems of Figures 2 and 6 function in a similar manner. The details of these two systems are to be understood as illustrative of any equivalent circuit arrangement. For example, single vertical and horizontal synchronizing-signal-generators may be used for alternate frames by cyclically switching (preferably electronically) a timing or frequency-changing element into or out of the frequency controlling circuit of the oscillators.

While the above description has indicated that the successive scannings follow without a pause, yet gaps can be placed therein, by changing the widths of the commutator segments of Figure 2 or by clamping the values and durations of the biasing voltages from 32 and 40 in Figure 6. Thus scanning of each picture could be arranged to occupy respectively three-quarters of $\frac{1}{60}$ of a second (followed by a gap of one-quarter of $\frac{1}{60}$ of a second) followed by the next scanning of three-quarters of $\frac{1}{20}$ of a second (followed by a gap of one-quarter of $\frac{1}{20}$ of a second). The particular case numerically illustrated above has assumed values of 1 for "*a*" and 3 for "*b*." Suppose, however, that $p$ is 441, $a$ is 2 and $b$ is 3. This leads to a value of 441 for $n$ and 543 for $m$, and requires a frequency of the oscillator of 38 of Figure 6 of "*c*" equal to 6 cycles per second. This gives 24 frames per second, which significantly corresponds to the number of frames per second of sound motion picture film and also corresponds, in its scanning arrangement, in a general way with the action of the special motion-picture projector used for iconoscope scanning of 35-mm. film for television transmission. This illustrates the flexibility of the new interlaced-timing television method.

The nature of the transmitted signal in the illustrative color television case previously considered is shown in the top line of Figure 9. In this line of the figure, the white level, black level, and peak-of-synchronized-signal level are indicated by explanatory legends. For the blue component-color pictures, there is a video signal 50, a line synchronizing signal 51 and a field synchronizing signal 52. For the red component-color pictures there is a video signal 53, a line synchronizing signal 54 and a field synchronizing signal 55. For the green component color pictures, there is a video signal 56, a line synchronizing signal 57 and a field synchronizing signal 58.

Minor variations and changes in these various synchronizing signals to adapt them to the highest standards of operation with a minimum of cross interference between line-synchronizing signals and field-synchronizing signals need not be here described since they are not pertinent to the present invention which is operatively disclosed in this description. It should here be pointed out parenthetically that the requisite precision of timing of field-synchronizing signals is presumably not so rigorous for interlaced-timing television as it is for interlaced-linear television of the conventional sort, since the precision requirements for line interlacing do not hold for interlaced-timing television where progressive scanning is exclusively used.

For convenience of reference, there is given below a recapitulation of the numerical values corresponding to each of the component signals in the composite transmitted wave.

Frequency of the blue-picture line synchronizing signals 51—58,500 per second.

Length of the blue-picture field synchronizing signal 52—$\frac{1}{1800}$ second.

Duration of blue picture from beginning to end of line-synchronizing signals 51—$\frac{9}{1800}$ of $\frac{1}{200}$ second.

(Thus the blue picture procedure involves a video transmission of $\frac{9}{1800}$ of a second and a field-synchronizing signal transmission of $\frac{1}{1800}$ second.)

Frequency of red-picture line-synchronizing signals 54—42,750 per second.

Length of red-picture field-synchronizing signal 55—$\frac{2}{1800}$ or $\frac{1}{900}$ second.

Duration of red-picture transmission—$\frac{18}{1800}$ or $\frac{1}{100}$ second.

(Thus the red-picture procedure involves sending the picture during $\frac{18}{1800}$ of a second and the transmission of the field-synchronizing signal during the remaining $\frac{2}{1800}$ of a second.)

Frequency of green-picture line-synchronizing signals 57—34,500 per second.

Duration of green-picture field-synchronizing signal 58—$\frac{3}{1800}$ or $\frac{1}{600}$ second.

Duration of green-picture transmission—$\frac{27}{1800}$ or $\frac{3}{200}$ second.

(Thus the green-picture procedure involves transmission of the picture for $\frac{27}{1800}$ second and transmission of the field-synchronizing signal for $\frac{3}{1800}$ second.)

The corresponding requisite field deflection waves are shown in the last three lines of Figure 9 and are therein suitably related by dashed lines to the corresponding portions of the top line of Figure 9. The field scanning wave is therefore 59 for the blue picture, 60 for the red picture, and 61 for the green picture. It will be noticed that the dashed portions of the scanning wave need not be generated and that the waves recur in a constant and interwoven relation, so to speak. That is, the next scanning wave for the next color picture in each instance is available at the beginning of such a wave as required. This suggests that if it were desired to keep each of the field deflection generators for each of the color-component pictures running continuously, no difficulty would result provided a proper selection method were used inasmuch as the waves of the three generators interweave, so to speak, at the desired and necessary times.

Figure 7 illustrates a combined mechanical and photo-electric method of carrying out the procedure described above in connection with Figure 9. The upper part of Figure 7 shows a color filter and a group of related light-transmitting templates. For convenience the arrangements have been shown in rectangular form though normally the filters and related templates would form part of either of a rotary disc or drum. Since it is obvious how to pass from the arrangements shown in the upper portion of Figure 7 to a disc or drum disposition of the corresponding filters and related templates, no further discussion of this point will be given.

The assembly of filters and templates is moved in the direction of arrow 104. Under heading P-Tricolor Filters, there are shown the blue filter 101, the red filter 102, and the green filter 103, the lengths of which filters are substantially in the relations of the times of transmission of the corresponding color-component pictures, and in phase therewith. 142 represents the objective lens in front of the camera tube which picks up the light passed in succession by the filters 101, 102, 103. The second line or Q shows the sawtooth-wave field-deflection templates 106—111. This has the shape of the scanning wave compositely shown in the last three lines of Figure 9 and described in detail above. 115 indicates a narrow slit behind which the template passes in the direction 104. Light passes through the template and the slit and falls on a photocell, the suitably amplified output of which produces the desired composite field-deflection scanning wave. As usual, the width of the slit 115 must be small in proportion to the horizontal dimensions of the scanning waves in the template in order to avoid the well-know aperture distortion.

The third line, or R, shows a 3-step template controlling the iconoscope beam focus. Inasmuch as the number of lines scanned in successive pictures differs, and since line overlap or, alternatively, spaces between lines are to be avoided in each picture, it is desirable that the size of the scanning spot be adjusted to correspond in each case to the number of lines in the corresponding picture of constant size. Naturally the size of the scanning spot is greatest for the blue pictures and least for the green pictures, in accordance with the above specifications illustratively chosen. 125 represents the scanning slit through which illumination passes through the various sections 117—118; 119—120; and 121—122 of the iconoscope-beam focus template. As previously suggested, the width of slit 125 must be small, so that the requisite controls of beam focus shall take place rapidly.

In the fourth line of Figure 7, S, there is shown a triple template arranged for the control of changes in the frequency of the line-deflection generators. As indicated in the above discussion, the frequency of the line-deflection wave is different for each of the three color-component pictures being greatest for the blue pictures and least for the green pictures. 132, 133, and 134 are three scanning slits. Light passing through them is capable of being transmitted and of effectuating a desired control as follows: light through slit 134 is active during the period of aperture 126—127; light through slit 133 is active during the period of aperture 128—129; and light passing through slit 132 is active during the period of aperture 130—131. The three apertures correspond respectively to the blue, red, and green component pictures.

In the fifth and last line of Figure 7 are shown apertures constituting a template for the generation of field blanking impulses to be utilized according to conventional television technique. These apertures 135, 137, and 139, correspond respectively to the following portions of the field-deflection sawtooth waves 106—108; —109; and 110—111 for the blue, red, and green component pictures respectively.

While the templates shown in Figure 7 are illustrative only, they do show the general photoelectric methods of control which can be used to carry out the interlaced-timing color television or monochromatic television results.

The methods of utilizing the outputs from the lens 142 as well as from the slits 115, 125, 132, 133, 134, and 141 are shown schematically in Figure 8. The tricolor filters P permit light to pass through lens 142 to the iconoscope 143. The output of the mosaic 194 is withdrawn through lead 145 or otherwise to the video amplifier 146, the output of which in turn passes through lead 147 to the modulator of the television transmitter (not shown). The output of template Q can be passed through a lens 115 and focused on the photocell 159 (although a lens is not inherently necessary). Output of cell 159 passes through amplifier 160 which is capable of reasonably distortionless amplification of the scanning wave. Thus, amplifier 160 should amplify frequencies up to ten times the fundamental frequency of the briefest sawtooth wave 106—107. The output of amplifier 160 passes through a lead 153 to the field deflection plates 152. While electrostatic deflection is here shown it will be understood that magnetic deflection can be equally used with or without change in the shape of the template Q.

The output of template R can be passed through a lens 125 and concentrated on photocell 161 and thence into the amplifier 162. The output of this amplifier actuates a control tube 164 in such a fashion that the focusing bias through conductor 151 on the focusing anode of the gun 150 is controlled thereby. It is obvious that, as the bias on the grid of 164 is changed, the drop of potential across resistance 167 is also changed and thus the total bias on the focusing electrode of the iconoscope is altered. Further analysis will show that an increase in the light falling on cell 161 can thus be made to contract the size of the scanning spot.

The outputs of slits 132—134, originating from templates S, are directed to the three photocells 173, 175, and 177 respectively. The outputs of each of these are amplified in the corresponding amplifiers 174, 176, and

178. These amplifiers in turn, when energized, transmit a potential through the corresponding conductors 179, 181, and 183 to the respective cut-off amplifiers 188, 189, and 190. These cut-off amplifiers are normally biased to cut off; and the application of an output potential on their grids from amplifier 174, 176, and 178 through the conductors 179, 181, 183 respectively removes or annuls the cut-off bias and thus enables these amplifiers to become operative and to transmit their respective outputs through conductors 191, 192, 193 into the common conductor 149, wherefrom the line-deflection plate 148 becomes effective. As indicated, electrostatic deflection is shown but need not necessarily be used. Three line-frequency sawtooth-wave generators 180, 182, and 184 are provided. Their respective outputs are applied to the amplifiers 188—190.

In view of the arrangements of the templates 8, it is clear that the output of a respective line-deflection generator will be applied as required for the corresponding scanning schedule. Generator 180, for example, has the line frequency requisite for the blue picture; generator 182 for the red picture; and generator 184 for the green picture.

It should be added that the arrangements for changing the line-deflection frequency illustrated in Figure 8 are only one of a number of possible ways of carrying out the invention. Thus, the generators 180, 182, and 184 may be combined into a single labile and controllable-frequency oscillator covering the desired line-deflection frequency range and controllable either by grid biasing or by the reflection thereinto of impedances which in turn are modified by electronic-tube action. However, for the transmitter at least, the arrangements shown in Figure 8 are simple and adequate.

It is desirable that the three line-deflection generators 180, 182, and 184 shall be associated in such fashion that their frequencies are derived from a common source also related to the frequency of the main field scanning cycle. This refinement, while desirable, is beyond the scope of the present invention and is mentioned purely for reference.

The output of templates T is shown as passing through a lens 141 and being concentrated on photocell 155. The output thereof is suitably amplified in 157 and passes through lead 154 to an appropriate control in the video amplifier 146 whereby the field-blanking action is obtained.

Shaping and equalizing circuits for the various waves generated according to this system are not shown in this disclosure. They constitute a refinement of fairly conventional nature and would normally be applied according to known methods in the utilization of this invention.

The methods shown in Figures 7 and 8 involve a photocell control having an essentially mechanical nature, in the main. It is now proposed to consider electronic arrangements at the transmitter and receiver for accomplishing the same results. These are shown for the transmitter in Figure 10, and for the receiver in Figure 11.

In the arrangement of Figure 10, 251 represents a scanning spot moving in the direction 252 over the segments 253—258. These segments are located as indicated broadly in the drawing of selector or distributor tube 376 in Figure 11. The respective segments correspond in duration to the rising and falling portions respectively of the composite field-deflection scanning wave 59—60—61 of Figure 9.

Tube 278 is a sawtooth generator for producing the field-deflection wave at terminal 282. It consists of the usual source of high potential 279 connected through a high resistance (which in this case is tube 277) to the anode of tube 278. The condenser 280 is charged in this fashion on the rising portion of the sawtooth wave and is discharged on the falling portion of the sawtooth wave when a suitable discharge potential is placed on the grid of tube 278.

The novel features of the arrangements of this sawtooth generator are as follows: In the first place, instead of a fixed high resistance in the charging circuit of the condenser 280, a controllable resistance in the form of tube 277 is introduced. Thus, by applying various potentials on the grid of 277, different rates of rise of the charging of condenser 280 can be carried out for such periods as the said grid potentials are applied. In the second place, by means of the application of different and suitable potentials to the grid of 278 for various periods of time, the discharge rate of condenser 280 can be altered, and any given discharge rate can be maintained for a specific time. Thus the arrangements shown enable the production of sawtooth waves, in a desired sequence, and with a predetermined rising portion and falling portion in each case.

The rising portions of the sawtooth waves for the color-component field deflections are controlled via the segments 253, 255, and 257. When the scanning beams strike these segments, a potential is applied via 266 to the amplifiers 267, which is of the type shown in the circuits associated with tube 273. By adjustment of the potentiometric voltages from 259, 260, and 261, different potentials are applied to the amplifier 267 during the blue, red, and green field deflection periods corresponding to the rising portions of the related sawtooth wave. Thus, by the action of tube 277 as explained above, the corresponding desired rising portions of the sawtooth waves, 59, 60, and 61 appear at the terminal 282.

During the periods that the scanning spot 251 (which may of course be a scanning line perpendicular to the length of the anode segments of the distributor tube) sweeps across 254, 256, and 258, potentials will be applied via 265 to the amplifier 268, which is also of the type shown in the circuits associated with the tube 273. Of course, other types of amplifier may be substituted without change in the purpose of general methods of the invention. Thus, potentials are applied from amplifier 268 to the grid of tube 278, bringing about the discharge of condenser 280 at a predetermined rate and for a desired period. During the times that condenser 280 is discharged, the falling portions of the field-deflection wave appear at the terminal 282. Charging currents of condenser 280 are indicated by 315; and discharge currents by 316. By suitable potentiometric controls 262, 263, and 264, respectively, the rates of fall of the sawtooth scanning waves for the blue, red, and green scannings respectively may be correctly controlled. Blanking signals for extinguishing the iconoscope scanning beam during the return portions of the scannings may obviously be obtained via conductor 281 appearing at 283 whence they are suitably utilized in conventional fashion.

The synchronous motion of spot or line 251 across the distributor tube segments 253—258 is carried out by deflecting the spot by two mutually perpendicular electric or magnetic fields which are in quadrature. The frequency of these fields is such that the spot makes one revolution between 214 and 239, that is, during one-thirtieth of a second. The 30-cycle energy required for the purpose, as well as energy at each of the line frequencies for generators 305—307, are rigidly tied in frequency to some standard source of potential; for example, at 60 cycles.

The selection of the corresponding line frequencies is shown in the lower portion of Figure 10. The scanning spot or line 291 (which may be associated with, a part of, or an extension of 251) moves across the second set of anode segments 293—295 in the selector tube synchronously with 251. The corresponding segments have the durations of the individual scanning waves for the blue, red, and green scannings respectively. The outputs from the segments control the amplifiers 299—301. Thus, by action quite similar to that previously described in connection with S of Figure 8, the appropriate line-deflection waves appear at 314 and are thence utilized appropriately to control the line deflection of the iconoscope scanning beam.

Passing to the reception of interlaced-timing color television, there are shown in Figure 11 illustrative circuits for accomplishing this result. Unessential or conventional portions of the circuits have been omitted.

The field-synchronizing and line-synchronizing signals pass through conductor 351 from the receiver and are impressed via conductors 352 and 353 on the respective operation circuits 354—355, and 360—361 respectively. Thus the field-synchronizing signals will predominantly appear in the output of tube 356 and in conductor 358.

Part of these field-synchronizing signals, which are of the type produced by T in Figure 7 or by anodes 254, 256, and 258 in the selector tube shown in Figure 10, will pass through conductor 366 to the various field-deflection sawtooth-wave generators 390, 396, and 402. They will then appear in the conductors 391, 397, and 403 as properly synchronized and phased sawtooth waves of deflection corresponding to 180, 90, and 60 waves per second much as shown in the second, third, and fourth lines of Figure 9. However, these deflection waves will not appear in the common output circuit 406, nor will they be impressed upon the field-deflection control member 411 of the receiver kinescope unless the cut-off bias on one of the amplifiers 392, 398, and 404 has been removed by means of a cutoff bias removal potential passing through one of the conductors 389, 395, or 401, which conductors carry the respective outputs of amplifiers 388, 394, or 400 respectively.

These three amplifiers 388, 394, and 400 are of the type shown in connection with tube 273 in Figure 10, and, as in Figure 10, are connected to the respective segmental anodes 382, 383, and 384 of the selector tube 376. The connecting arrow 379 sufficiently indicates the identity of the circular segmental anodes in tube 376 with their developed form as shown in 382—384. Whenever the scanning beam 377 in the selector tube impinges upon one of the anodes 382—384, the corresponding amplifier 388, 394, or 400 produces an output which removes the cut-off bias on the corresponding amplifier 392, 398, or 404, thus producing the corresponding and desired field deflection in kinescope 409. The scanning spot in selector tube 376 is indicated by 380 and its direction of motion by 381.

The scanning beam 377 in selector 376 has a scanning spot on the segmental anodes which rotates uniformly with one revolution in one-thirtieth of a second (that is, the time between 214 and 239 in Figure 9). This beam rotation is effected by having quadrature currents of 30-cycle frequency and of sinusoidal form appear in the deflecting coil 375. These quadrature currents are produced by the illustrative phase-splitting circuits 372—373 and 374—375 respectively, a 30-cycle potential being fed to the system through conductor 370.

It remains only to indicate the method of originating the necessary 30-cycle potential in question. There are many ways of deriving such a current from the output of conductor 358. One rather elaborate but reliable method is to provide the optional blocking oscillator 367 which has a normal frequency slightly lower than 30 cycles and which is arranged to respond, say, to the briefest (and presumably most intense) blanking or synchronizing impulses appearing in 358, these being the blue-component blanking impulses produced by template 135 in Figure 9 or segment 254 in Figure 10. This blocking oscillator in turn may control a 30-cycle sawtooth oscillator 368 from the output of which a sinusoidal 30-cycle current may be derived via the tuned 30-cycle amplifier 369.

The line-deflection signals are derived from the circuits associated with tube 362 and pass through conductor 365 to a highly labile line-deflection sawtooth generator 407 effectively covering the range of frequencies required for the blue, red, and green component pictures for their respective line deflections. The output of generator 407 is applied through 408 to the line-deflection control member 412.

An appropriate color-filter disc is so located as to permit the viewing of the pictures appearing on the fluorescent screen 413 of kinescope 409. The color disc 414 is driven by the synchronized motor 415, the supply energy for which is carried thereto by conductor 371 as a part of the output of amplifier 369.

As indicated above, the system 367—369 is energized and controlled in frequency and phase preferably by one of the synchronizing signals of the color-component pictures; e. g., the blue or the green synchronizing signals. If the blue-synchronizing signals are used they will consist of impulses approximately one-eighteen-hundredth second in length recurring every one-thirtieth of a second.

Either the tube 376 or the deflecting system 375—373 may be constructed or mounted so as to be rotatable without disturbance of the connections thereof, and through a major portion of a revolution, around an axis running centrally and longitudinally through the selector tube 376 (and therefore substantially corresponding to the undeflected position of the electronic beam 377 therein). This rotation permits phase adjustment whereby the field-synchronizing controls are brought into proper timed relation with the outputs of generators 390, 396, and 402 thus giving correctly timed operation of the system.

As in the case of the transmitter, the scanning spot at the end of beam 410 in kinescope 409 must be of variable size so that a smooth raster is produced for each of the three color-component pictures despite their differences in number of lines per picture. The general circuit arrangement for accomplishing such focusing of the scanning spot is illustrated in the system between conductors 161 and 151 in Figure 8 and need not be here repeated. It need only be added that the controls for the amplifier corresponding to 162 in Figure 8 are derived respectively, and through appropriate potentiometrically-adjustable voltages from the respective amplifiers 388, 394, and 400, being then applied through a circuit arrangement analogous to that shown associated with tube 164 in Figure 8 to the focus anode of kinescope 409.

As previously stated, the line-deflection generator 407 must be controllable in frequency over a wide range and thus be highly labile, whereas, for precise operation, the generators 390, 396, and 402 should be much less labile and normally operable only when excited by respective frequencies close to 180, 90 and 60 cycles respectively, each of the said generators being normally operative in a free condition at a slightly lower frequency than that at which it is controlled for the operation of the system.

While the application of interlaced-timing color television has been specifically described as applied to the sequential or cyclic method of color television, it should be understood that the method in question can be applied as well to simultaneous color television (e. g., of the electronic type). In simultaneous color television, the color-component pictures are transmitted simultaneously. By using the same frequency band width for each of the pictures, or approximately so, but by having different field frequencies and number-of-lines-per-picture for each of the color-component pictures, the methods of the present disclosure can be readily applied to simultaneous color television. As typical examples of the field frequencies and number of lines per picture to be adopted for each of the color-component pictures, the illustrative examples given herein will be adequate.

What the invention provides is an improved television scanning system and method of operation which are applicable to monochromatic television for minimizing flicker and are applicable to color television for producing each component-color picture with such resolution as is adapted to the delineating capabilities of that particular color.

What is claimed is:

1. A color television transmitter comprising in combination, a cathode ray pickup tube, said tube being comprised of an electron gun adapted to project a beam of electrons, a first deflecting means adapted to deflect said beam in one direction, and a second deflecting means adapted to deflect said beam in a direction perpendicular to said one direction, means for successively exposing said pickup tube to different color light from a scene to be televised, the duration of the successive exposures being different, a generator of field frequency deflection waves, said deflection waves having durations corresponding to durations of said successive exposures, means for applying said field deflection waves to said first deflection means, a generator of line deflection waves, the number of said waves occurring during a field deflection wave corresponding to the relative duration of said exposures, means for supplying said line deflection waves to said second deflecting means, and means for changing the cross sectional area of said beam of electrons inversely to the number of said beam deflection waves occurring during a field deflection wave.

2. A color television receiver comprising in combination a kinescope having an electron gun adapted to project a beam of electrons, a first means for deflecting a beam in one direction, and a second means for deflecting a beam in a perpendicular direction, a line deflection generator adapted to derive deflection waves at different line frequencies, the output of said generator being applied to said first deflecting means, a field deflection generator adapted to derive deflection waves of different field frequencies, said latter waves being coupled to the second deflection means, means for cyclically selecting predetermined combinations of said deflection wave frequencies, means for cyclically interposing optical filters adapted to pass different color light in front of said kinescope, and means for making the cyclic change of said filters correspond to the cyclic selection of predetermined combinations of deflection wave frequencies.

3. Color television apparatus which comprises image pickup tube means having line scanning means and field scanning means associated therewith for causing an electron beam therein to scan a raster; means for imaging a color scene onto said pickup means; means for electrically energizing each of said line and field scanning means; means for selectively causing said field scanning means energization to have a longer time duration for one component color of such image and means associated with said last-named means for selectively varying the energization of said line scanning means whereby to vary the period of each of such lines in proportion to the time duration of such field scanning means energization.

4. Color television apparatus as defined by claim 3 which includes means for selectively varying the cross-sectional area of such electron beam inversely as the time duration of such field scanning means energization.

References Cited in the file of this patent

UNITED STATES PATENTS

| | | |
|---|---|---|
| 2,227,005 | Schlesinger | Dec. 31, 1940 |
| 2,369,783 | Homrighous | Feb. 20, 1945 |
| 2,378,746 | Beers | June 19, 1945 |